June 13, 1933. P. B. JOHNSON 1,914,022
CHICKEN MITES AND LICE TRAP
Filed May 17, 1930
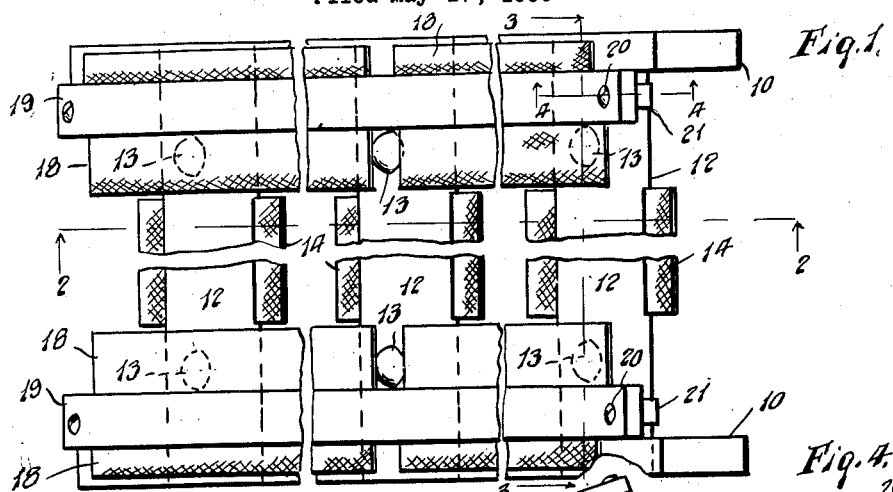
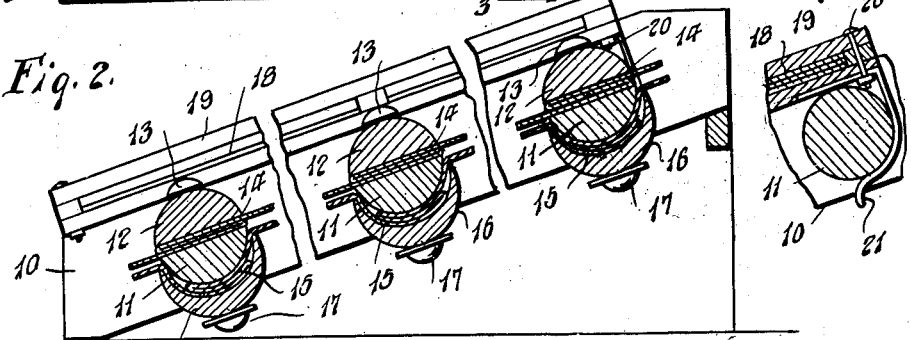
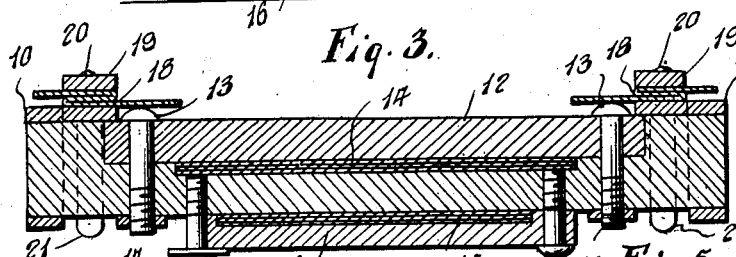
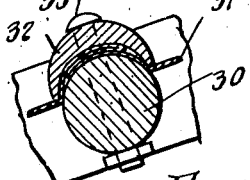
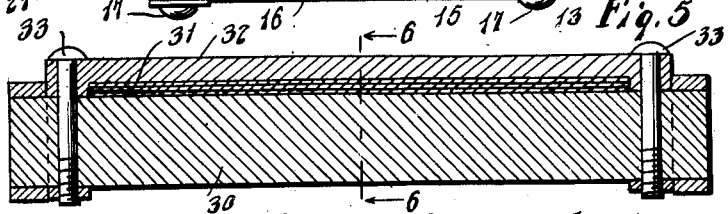
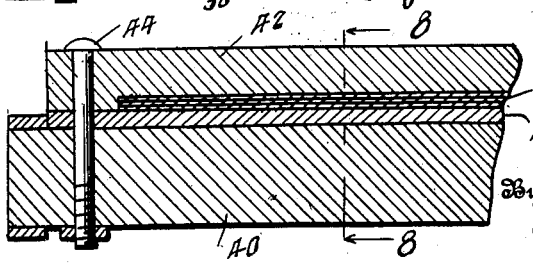
Inventor
P. B. Johnson.
By L. F. Randolph Jr.
Attorney Patented June 13, 1933

1,914,022

UNITED STATES PATENT OFFICE

PHILIP B. JOHNSON, OF DOUGLAS, NORTH DAKOTA

CHICKEN MITES AND LICE TRAP

Application filed May 17, 1930. Serial No. 453,323.

This invention relates to a chicken mite and lice trap.

It is aimed to provide a novel means whereby fabric or other relatively soft material having an attraction for mites and lice when engaged with the feathers of a chicken, may be secured to members of roosts, nests or the like and from time to time be destroyed or treated so as to kill the vermin.

The more specific objects and advantages will become apparent from a consideration of the description following taken in connection with accompanying drawing illustrating an operative embodiment, and wherein:—

Figure 1 is a plan view of a roost embodying the invention,

Figure 2 is a sectional view taken on the line 2—2 of Figure 1,

Figure 3 is a sectional view taken on the line 3—3 of Figure 1,

Figure 4 is a sectional view taken on the line 4—4 of Figure 1,

Figure 5 is a sectional view taken through a modified form,

Figure 6 is a sectional view taken on the line 6—6 of Figure 5,

Figure 7 is a sectional view taken through another modified form, and

Figure 8 is a sectional view taken on the line 8—8 of Figure 7.

Referring specifically to the drawing and first to the form of the invention shown in Figures 1 to 3, a conventional roost is shown embodying suitably supported side members 10 and perches or poles 11, at different elevations connected to and between them. Such perches may have removable sections 12 detachably connected to the remainder thereof by means of bolts 13. Between the sections 12 and remainder of the perches, trap members 14 are removably positioned.

In addition, trap members 15 may be arranged against the under surface of the perches 11 and be clamped thereto by arcuate plates 16 which are bolted or otherwise detachably fastened as at 17 to the perches.

At the sides of the roost, trap members 18 are arranged, the same being clamped between suitably spaced bars 19 detachably connected together as by means of bolts 20. The bolts 20 also secure clasp fingers 21 to the bars and the latter are adapted to yieldingly and detachably engage over adjacent perches as shown, such clasps being of resilient metal.

The trap elements in each of the instances described may be made of suitable sheets of flexible material such as textile fabric, paper or any other material which has an attraction for the mites or lice when the same come into contact with or adjacent the body of the chicken. The trap members are usually folded as shown in Figure 2, and have opposite edges extending beyond the sides of the perch to provide a harbor for mites and lice traveling to and from the chickens on the roost, and as the vermin usually remain on the trap members for at least a day the trap members may be removed from time to time and destroyed as by burning, or they may be scalded or in any other suitable way treated to kill the lice, and then reused if desired.

A modified form is shown in Figures 5 and 6 where the perch 30 is not sectional and has one of the traps according to the construction previously described as at 31, secured in place by an arcuate clamp plate 32 bolted at 33 to the perch 30.

In the form shown in Figures 7 and 8, an unbroken or non-sectional perch 40 is used, a bar 41 being fitted against the same and between the latter and a clamp plate 42, a trap member 43 is positioned. The members 40, 41 and 42 are detachably bolted together as at 44. The trap 43 in the present form is of the same material as used in all of the other forms.

Attention is called to the fact that the trap members are preferably doubled twice upon themselves as shown in each instance, so that the same may be pulled to any extent desired beyond the perch and in this respect are substantially adjustable.

Various changes may be resorted to provided they fall within the spirit and scope of the invention.

I claim as my invention:—

1. A device of the class described comprising a perch, a flexible fabric trap member associated therewith, means clamping the trap member to the perch, the clamped portion of the trap member being folded upon itself a plurality of times for the purpose specified and the terminals of the trap member projecting beyond the perch to form rendezvous for lice and mites travelling toward the perch.

2. In combination with a perch, a trap member of flexible fabric material having a portion thereof projecting beyond the perch to form a rendezvous for lice and mites traveling towards the perch, said fabric member being folded intermediate of its opposite edges, and means clamping the folded portions to the perch, the projecting portions of the material being adapted to be pulled out for the purpose specified.

3. In combination with a perch comprising detachable sections, a flexible trap member folded intermediate of its opposite edges and the folded portions mounted between the sections, means to clamp the trap member between the sections and to secure the sections together, said opposite edges of the trap member projecting beyond the perch to provide rendezvous for vermin on the perch, said opposite edges being adapted to be pulled out for the purpose specified.

4. In combination with a perch comprising separable sections, a flexible trap member between the sections, said trap member consisting of a sheet of fabric material folded on itself and having its opposite edges extending beyond the perch, means to clamp said sections together and said trap member in place, a second flexible trap member disposed against one of the sections, said trap member consisting of a sheet of fabric material folded on itself and having its opposite edges extending beyond the perch, a plate engaging the second trap member, and means holding said plate secured to the perch and the last mentioned trap member clamped thereto.

In testimony whereof I affix my signature.

PHILIP B. JOHNSON.